US008717528B2

(12) United States Patent
Wang

(10) Patent No.: US 8,717,528 B2
(45) Date of Patent: May 6, 2014

(54) LIQUID CRYSTAL DISPLAY PANEL AND LIQUID CRYSTAL DISPLAY

(75) Inventor: Zheng Wang, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 56 days.

(21) Appl. No.: 13/469,472

(22) Filed: May 11, 2012

(65) Prior Publication Data

US 2012/0287392 A1 Nov. 15, 2012

(30) Foreign Application Priority Data

May 12, 2011 (CN) .................... 2011 2 0150476 U

(51) Int. Cl.
*G02F 1/1339* (2006.01)
(52) U.S. Cl.
USPC .............. 349/155; 349/12; 349/110; 345/173
(58) Field of Classification Search
None
See application file for complete search history.

(56) References Cited

U.S. PATENT DOCUMENTS 8,077,136 B2 * 12/2011 Ito .................................. 345/102
8,134,652 B2 *  3/2012 Rho et al. ........................ 349/12

* cited by examiner

*Primary Examiner* — Richard Kim

(74) *Attorney, Agent, or Firm* — Ladas & Parry LLP

(57) ABSTRACT

A liquid crystal display is disclosed which comprises a first substrate and a second substrate, which are supported by primary spacers. At least a secondary spacer is provided on the first substrate, and the secondary spacer is covered by a conductive electrode. An X-direction detecting wire and a Y-direction detecting wire perpendicular to each other are provided on the second substrate, the X-direction detecting wire and the Y-direction detecting wire are respectively provided with a first connection electrode and a second connection electrode; and positions of the first and second connection electrodes on the second substrate correspond to a position of the secondary spacer on the first substrate; under a press condition, at least one of the first and second connection electrodes contacts with the secondary spacer and is connected with the conductive electrode on the secondary spacer.

9 Claims, 3 Drawing Sheets

LIQUID CRYSTAL DISPLAY PANEL AND LIQUID CRYSTAL DISPLAY

BACKGROUND

The present disclosure relates to a liquid crystal display panel and a liquid crystal display.

In conventional technology, in order to realize the touch functionality of a liquid crystal display (LCD), one of the implementation manners is to attach a film having touch functionality on an LCD panel (that is, touch film on panel). Since it is necessary to attach a film on a substrate of the panel, such an implementation manner results in a decrease of transmittance of the LCD panel, which in turn impacts the technical properties, such as brightness of a displayed picture, contrast or the like, and also decreases the sharpness of the displayed picture. In addition, attaching the touch film can also increase the thickness and the weight of the LCD panel, increase the complexity of the manufacturing process of the LCD, and increase production costs. Also, the life span of the externally exposed touch film can be influenced by the external environment.

In conventional technology, in order to realize the touch functionality of an LCD, another implementation manner is to adopt a touch technology of in-cell type, that is, the structure to obtain the functionality of touch detection is provided within the cell of the liquid crystal panel. Because the existing in-cell touch technology needs to incorporate circuit structures on an array substrate, the difficulty of wiring is increased, and the pixel aperture ratio is decreased, disadvantageously influencing the brightness of the LCD panel. The so-called pixel aperture ratio refers to the ratio of the area of each pixel other than the wiring portion and the transistor portion (typically shielded by a black matrix) through which light can pass for display to the total area of each pixel. The higher the pixel aperture ratio is, the higher the efficiency of light transmission can be obtained.

Thus, it can be seen that the conventional technology to realize the touch functionality of an LCD can result in a decrease of the technical properties, such as the brightness, contrast, pixel aperture ratio, or the like, and thus it is disadvantageous in improving the performance of the LCD panel.

SUMMARY

An embodiment of the disclosed technology provides an LCD panel with respect to the problem of the decrease of the technical properties, such as brightness, contrast, pixel aperture ratio or the like, of the LCD panel, which is caused for realizing the touch functionality of the LCD panel.

An aspect of the disclose technology provides a liquid crystal display panel comprising: a first substrate, and a second substrate, the first substrate and the second substrate being supported by primary spacers, wherein at least a secondary spacer is provided on the first substrate, and the secondary spacer is covered by a conductive electrode; an X-direction detecting wire and a Y-direction detecting wire perpendicular to each other are provided on the second substrate, the X-direction detecting wire and the Y-direction detecting wire are respectively provided with a first connection electrode and a second connection electrode, which are electrically separated, at an intersection of the X-direction detecting wire and the Y-direction detecting wire; and positions of the first and second connection electrodes on the second substrate correspond to a position of the secondary spacer on the first substrate; under a natural condition, the first and second connection electrodes on the second substrate do not contact with the secondary spacer on the first substrate, and under a press condition, at least one of the first and second connection electrodes on the second substrate contacts with the secondary spacer on the first substrate and is connected with the conductive electrode on the secondary spacer.

In one embodiment, the first substrate is further provided with a common electrode, and the common electrode is connected with the conductive electrode on the secondary spacer.

In one embodiment, the height of the secondary spacer is less than that of the primary spacer.

In one embodiment, the X-direction detecting wire and the Y-direction detecting wire are located at an area of a black matrix on the second substrate.

In one embodiment, the intersection of the X-direction detecting wire and the Y-direction detecting wire is not covered by the black matrix.

In one embodiment, the X-direction detecting wire and the Y-direction detecting wire are separated by an insulation layer, and the intersection of the X-direction detecting wire and the Y-direction detecting wire is not connected.

In one embodiment, an X-direction sensor connected with the X-direction detecting wire and a Y-direction sensor connected with the Y-direction detecting wire are provided on the periphery of the second substrate.

In one embodiment, a touch driving circuit connecting the X-direction sensor and the Y-direction sensor is further provided.

In one embodiment, in the press condition, the first and second connection electrodes on the second substrate contact with the secondary spacer on the first substrate and connected with each other through the conductive electrode on the secondary spacer.

In one embodiment, at least one of the first connection electrode and the second connection electrode is in a form of via hole.

Another aspect of the disclosed technology provides a liquid crystal display, and this liquid crystal display comprises one embodiment of the above-described liquid crystal panel.

Compared with the conventional technology of touch-film-on-panel, the embodiment of the liquid crystal display provided by the present disclosure can eliminate the process for attaching a touch-screen film, such that the production cost is decreased, the thickness and the weight of the LCD panel is decreased, the degree of integration of the product is improved, the technical properties, such as transmittance, brightness, contrast and the like, of the LCD panel can be improved, the sharpness of the displayed picture is improved, and thus the performance of the LCD panel is improved. Compared with the conventional in-cell technical solution, in the embodiment the disclosed technology, the complexity of wiring is low, the process difficulty also become relatively lower, thereby the production cost is decreased, and the aperture ratio of pixel is increased, and thus the performance of the LCD panel is improved.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
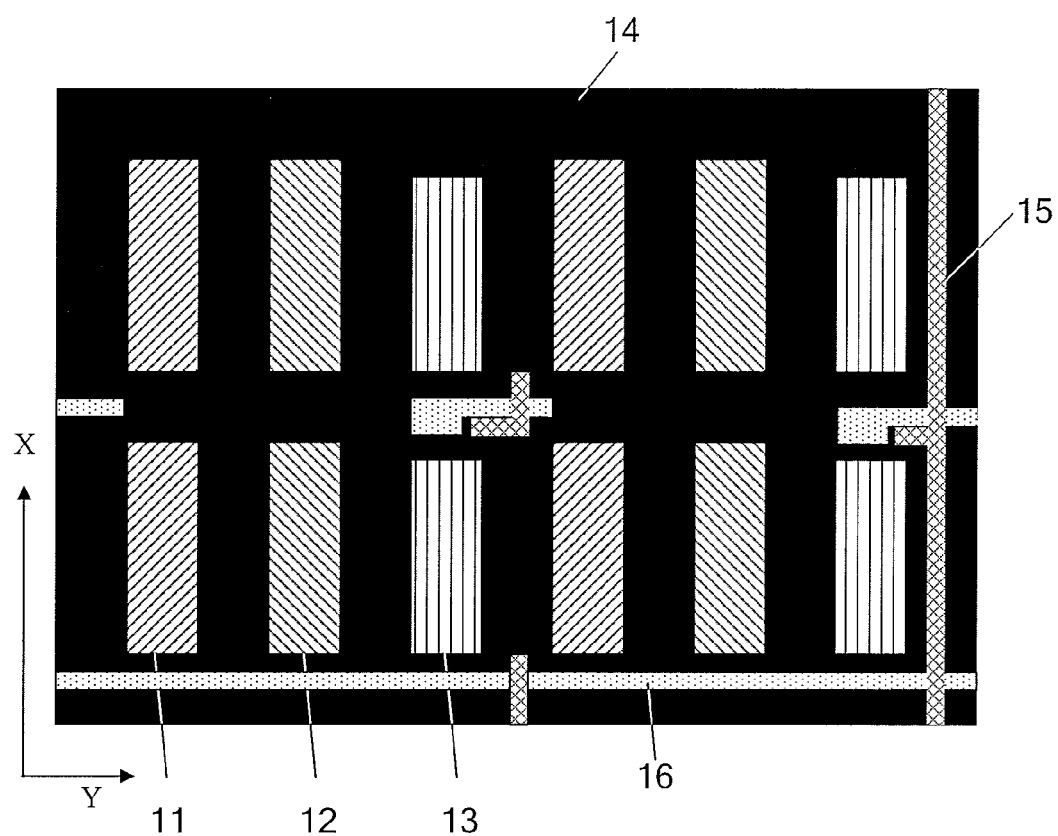
FIG. 1 is a first schematic view of the second substrate surface structure in an embodiment of the present disclosure.

Hereinafter, a further detailed description will be made for the technical solutions of the disclosed technology in conjunction with the accompany drawings and the specific embodiments.

An embodiment of the present disclosure provides a structure of an LCD panel which can be integrated with a touch-screen functionality inside a liquid crystal cell. The panel comprises a first substrate (e.g., an array substrate) and a second substrate (e.g., a color-filter substrate). The array substrate comprises a pixel array composed of a number of pixel units, and at the peripheral of the pixel array are provided with driving circuits (drivers), such as a data driving circuit, a gate driving circuit, and so on. The color-filter (CF) substrate comprises a color-filer array composed of color film photoresists of different colors, for example. The color film photoresist units in the color-filer array correspond to the pixel units of the pixel array on the array substrate. A kind of typical color film photoresist arrangement comprises a red color film photoresist (R color-filter), a green color film photoresist (G color-filter) and a blue color film photoresist (B color-filter). In addition, between the array substrate and the CF substrate, there are provided primary spacers to support the substrates to maintain a cell gap. One end of each primary spacer is provided on one of the color-filter substrate and the array substrate, and the other end of the primary spacer contacts with the other of the color-filter substrate and the array substrate.

In the structure of the embodiment of the present disclosure, there are provided secondary spacers on the array substrate, the height of which secondary spacers is less than that of the primary spacers, and the secondary spacers are covered by a conductive electrode to provide a conductive surface. For example, indium tin oxide (ITO) or indium zinc oxide (IZO) can be adopted to form the conductive electrodes on the secondary spacers, and ITO is a transparent conductive material used to realize conductivity. The conductive electrode can be formed of a metal material. On the CF substrate there are provided at least an X-direction (e.g., longitudinal direction) detecting wire and at least a Y-direction (e.g., transverse direction) detecting wire which are perpendicular to each other. On the X-direction detecting wire and the Y-direction detecting wire, there are provided a first and second connection electrodes, respectively. The connection electrode can be in the form of via hole covered by a conductive electrode, such as an ITO electrode or a metal electrode, and the disclosed technology is not limited thereto. The positions of the connection electrodes of the detecting wires on the CF substrate and the positions of the secondary spacers on the array substrate correspond to each other. Under a natural condition, the connection electrodes on the CF substrate and the corresponding secondary spacer on the array substrate do not come into contact with each other; under the press condition in which the panel is pressed by an user for example, the at least one of the first and second connection electrodes on the CF substrate contact with the corresponding secondary spacer on the array substrate, or further both the first connection electrode of the X-direction detecting wire and the second connection electrode of the Y-direction detecting wire are electrically connected with the secondary spacer and thus connected with each other.

In addition, on the array substrate there is provided a common electrode, the conductive electrode on the secondary spacer is connected with the common electrode.

In a panel structure of the embodiment of the present disclosure, when an external force is exerted on the CF substrate (e.g., touched by a user), the CF substrate is deformed, and the ITO electrode on the secondary spacer on the array substrate (connected with the common electrode and being at a voltage equivalent to the common voltage) contacts the ITO electrodes at the via holes on the CF substrate (i.e., contacts the X-direction detecting wire and the Y-direction detecting wire that cross each other), such that the X-direction detecting wire or the Y-direction detecting wire or both are electrically connected with the conductive electrode of the secondary spacer and applied with a voltage, and the voltage of the X-direction detecting wire or the Y-direction detecting wire are changed. By collecting the electric signals on the CF substrate, the position of the touch can be detected and determined.

As shown in FIG. 1, which is a schematic view 1 of the CF substrate surface structure in an embodiment of the present disclosure, on the CF substrate, the R color-filters 11, the G color-filters 12, and the B color-filters 13 form an array distribution defined by a black matrix (BM) 14, and in the area of the black matrix 14 of the CF substrate, there are arranged at least an X-direction detecting wire 15 and at least a Y-direction detecting wire 16 which are perpendicular to and crossed with each other. The X-direction detecting wire 15 and the Y-direction detecting wire 16 are arranged in the area of the black matrix 14, and therefore do not influence the displaying effect of the liquid crystal panel. The X-direction detecting wire 15 and the Y-direction detecting wire 16 are perpendicular to each other, but do not connect with each other. In an example, at the intersection of the X-direction detecting wire 15 and the Y-direction detecting wire 16, there are no black matrix 14, R color-filter 11, G color-filter 12, and B color-filter 13.

Figure 2:
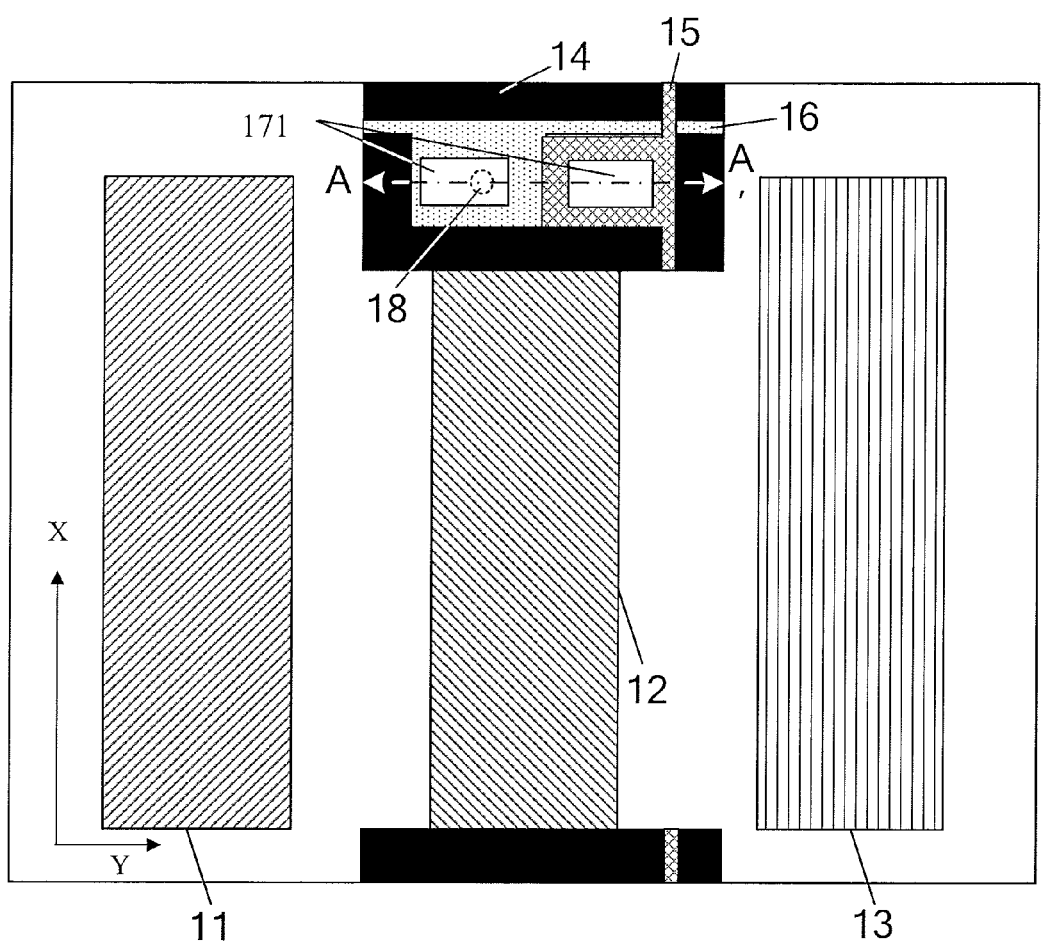
FIG. 2 is a second schematic view of the second substrate surface structure in an embodiment of the present disclosure.

Further, as shown in FIG. 2, which is a schematic view 2 of the CF substrate surface structure in the embodiment of the present disclosure, the X-direction detecting wire 15 and the Y-direction detecting wire 16 are separated by an insulation layer, and there is no connection at the intersection between the X-direction detecting wire 15 and the Y-direction detecting wire 16. On each of the X-direction detecting wire 15 and the Y-direction detecting wire 16 there is provided a connection electrode in a form of via hole 18. The via hole 18 is covered with an ITO electrode, for example. The ITO electrodes respectively covering the X-direction detecting wire 15 and the Y-direction detecting wire 16 are indicated with the numeral 171 in FIG. 2. Provision of ITO electrodes is to realize electric connection of the X-direction detecting wire 15 and the Y-direction detecting wire 16 when coming into contact with the ITO electrode of the corresponding secondary spacer on the array substrate.

Figure 3:
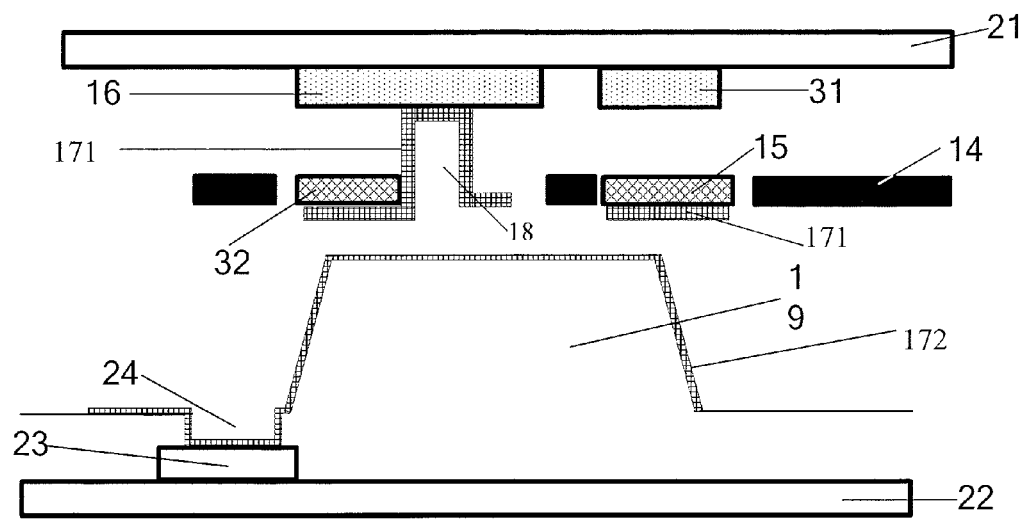
FIG. 3 is a schematic sectional view of the second substrate and the first substrate in an embodiment of the present disclosure, taken along the line A-A' in FIG. 2.

Hereinafter, in conjunction with the schematic view shown in FIG. 3, a further detailed description will be made for the inner structure of an embodiment of the present disclosure. FIG. 3 is a schematic sectional view of the CF substrate and the array substrate taken along the line A-A' in FIG. 2 (the array substrate is located under the CF substrate in FIG. 2). As can be seen from FIG. 3, in the area of the BM 14 of the CF substrate 21, there are arranged the X-direction detecting wire 15 and the Y-direction detecting wire 16 which are perpendicular to each other. On the X-direction detecting wire 15 and the Y-direction detecting wire 16, there is formed a via hole 18, respectively. Thereafter, on the CF substrate 21 provided with the via hole 18, an ITO layer is deposited, and the ITO electrode 171 is allowed to blanket the via hole 18. The blank area between the X-direction detecting wire 15 and the Y-direction detecting wire 16 is an insulation layer in the drawing. It should be noted that, the portion designated by the numeral 31 in FIG. 3 is not a part of the Y-direction detecting wire 16 but a light blocking strip to block light. The portion designated by the numeral 32 in FIG. 3 is not a part of the X-direction detecting wire 15 but a light blocking strip to block light.

An exemplary manufacturing process of the CF substrate 21 comprises the following steps: performing depositing/coating, exposing, etching, photoresist removing, cleaning and the like to form the Y-direction wire 16, the insulation layer, the X-direction wire 15, the black matrix 14, the R/G/B color film photoresists, the via holes 18, the ITO layer in this order on a supporting substrate (e.g., a glass substrate or a plastic substrate), thereby obtaining the structure of the CF substrate 21 shown in FIG. 3.

On the array substrate 22 there are provided primary spacers (not shown) and secondary spacers 19, and each of the secondary spacers 19 is covered by the ITO electrode 172. The position of the via hole 18 on the CF substrate 21 and the position of the corresponding secondary spacer 19 on the array substrate 22 correspond to each other. Under a natural condition, the via hole 18 on the CF substrate 21 and the corresponding secondary spacer 19 on the array substrate 22 do not come into contact with each other. In addition, in an example, on the secondary spacer 19 there is further provided a via hole 24, and the via hole 24 is also covered by the ITO electrode 172. On the array substrate 22 there is also provided a common electrode 23, and the ITO electrode 172 at the via hole 24 of the secondary spacer 19 is connected with a common electrode 23.

An exemplary manufacturing process of the array substrate 22 comprises the following steps: performing depositing/coating, exposing, etching, photoresist removing, cleaning and the like to create a gate layer, a gate insulation layer, an a-Si semiconductor layer, a source/drain layer, an inactivate layer, a spacer, a via hole 24, an ITO layer in this order on a supporting substrate (e.g., a glass substrate or a plastic substrate), thereby obtaining the structure of the array substrate 22 shown in FIG. 3.

Figure 4:
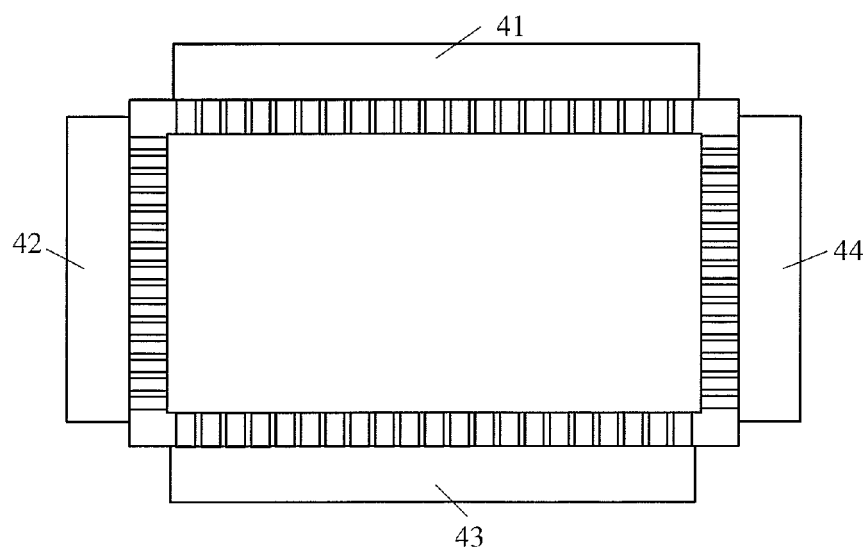
FIG. 4 is a schematic view of a substrate and its peripheral components in an embodiment of the present disclosure.

A schematic view of the substrates according to the embodiment of the present disclosure and their peripheral components is shown in FIG. 4. At the periphery (e.g., one side) of the CF substrate and the array substrate, there are provided a data driving circuit 41 and a gate driving circuit 42. In addition, there are also provided an X-direction sensor (detector) 43 connected with the X-direction detecting wire, and a Y-direction sensor (detector) 44 connected with the Y-direction detecting wire. A touch driving circuit (not shown in the drawing) connected with the X-direction sensor 43 and the Y-direction sensor 44 is also comprised in the structure of the present disclosure.

In conjunction with the schematic views of FIG. 3 and FIG. 4, when an external force is exerted on the CF substrate 21 (e.g., touched by a user), the CF substrate 21 is deformed, and the ITO electrode 172 of the secondary spacer 19 on the array substrate 22 (e.g., connected with the common electrode 23 and at a voltage equivalent to the common voltage) contacts the ITO electrode 171 at the corresponding via hole 18 on the CF substrate 21 (i.e., indirectly contacts the X-direction detecting wire 15 and/or the Y-direction detecting wire 16), such that the X-direction detecting wire 15 and/or the Y-direction detecting wire 16 are electrically connected with the ITO electrode 172 and applied with a voltage (energized), such that the voltage of the X-direction detecting wire 15 and/or the Y-direction detecting wire 16 is changed, which change in voltage can be sensed by the X-direction sensor 43 and/or the Y-direction sensor 44, and reported to that touch driving circuit. The touch point is determined by the touch driving circuit.

It should be noted that, one secondary spacer 19 allows the corresponding X-direction detecting wire 15 and/or Y-direction detecting wire 16 to be energized (the secondary spacer 19 in FIG. 3 allows the corresponding Y-direction detecting wire 16 and the corresponding X-direction detecting wire 15 to be energized). Of course, one secondary spacer 19 can also allow only one detecting wire to be energized, that is, the position of the via hole of the detecting wire are provided at a relatively low density, not as relatively closer to each other as shown in FIG. 3. When the CF substrate 21 is touched by a user, the contact area with the CF substrate 21 by the user is much larger than the area of the substrate corresponding to one secondary spacer 19. Among the plurality of secondary spacers 19, there existed some secondary spacers 19 to allow the Y-direction detecting wire 16 to be energized, and some secondary spacer 19 to allow the X-direction detecting wires 15 to be energized. The voltage change on the X-direction detecting wire 15 and the Y-direction detecting wire 16 can allow the X-direction sensor 43 and the Y-direction sensor 44 to be detected, and the results are reported to the touch driving circuit. With the voltage change of X-direction and Y-direction, the touch point is allowed to be determined accurately.

There is provided a structure of a liquid crystal display panel with touch-screen functionality according to one embodiment of the present disclosure, which is used to incorporate a touch detection structure the inside of the liquid crystal cell of the panel by the improvements to the array substrate and the CF substrate, thus a touch-screen functionality integrated inside a liquid crystal cell is realized. The panel can be used for the displays for mobile phones, computer, TV set, and so on.

Compared with the conational technologies of touch-film-on-panel, the embodiments of the present disclosure can eliminate the process for attaching touch-screen film, such that the production cost can be decreased, the thickness and the weight of the LCD panel is decreased, the degree of integrity of the product is improved, the technical properties, such as transmittance, brightness, contrast and the like, of the LCD panel is improved, the sharpness of the displayed picture is improved, and thus the performance of the LCD panel is improved. Compared with the conventional in-cell technology, the complexity of wiring become low, the process difficulty is also relatively lower, thereby the production cost is decreased, and the aperture ratio of pixel can be increased, and thus the performance of the LCD panel is improved.

The embodiments described above are only exemplar embodiments of the present disclosure, and not intended to limit the protection scope of the present disclosure.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. A liquid crystal display panel comprising:
a first substrate, and
a second substrate, the first substrate and the second substrate being supported by primary spacers, wherein
at least a secondary spacer is provided on the first substrate, and the secondary spacer is covered by a conductive electrode;
an X-direction detecting wire and a Y-direction detecting wire perpendicular to each other are provided on the second substrate, the X-direction detecting wire and the Y-direction detecting wire are respectively provided with a first connection electrode and a second connection electrode, which are electrically separated, at an intersection of the X-direction detecting wire and the Y-direction detecting wire; and
positions of the first and second connection electrodes on the second substrate correspond to a position of the secondary spacer on the first substrate; under a natural condition, the first and second connection electrodes on the second substrate do not contact with the secondary spacer on the first substrate, and under a press condition, at least one of the first and second connection electrodes on the second substrate contacts with the secondary spacer on the first substrate and is connected with the conductive electrode on the secondary spacer;
wherein the second substrate comprises a black matrix, and the X-direction detecting wire and the Y-direction detecting wire are located at an area of the black matrix on the second substrate, and the intersection of the X-direction detecting wire and the Y-direction detecting wire is not covered by the black matrix.

2. The liquid crystal display panel according to claim 1, wherein the first substrate is further provided with a common electrode, and the common electrode is connected with the conductive electrode on the secondary spacer.

3. The liquid crystal display panel according to claim 1, wherein the height of the secondary spacer is less than that of the primary spacers.

4. The liquid crystal display panel according to claim 1, wherein the X-direction detecting wire and the Y-direction detecting wire are separated by an insulation layer, and at the intersection the X-direction detecting wire and the Y-direction detecting wire are not connected.

5. The liquid crystal display panel according to claim 1, wherein an X-direction sensor connected with the X-direction detecting wire and a Y-direction sensor connected with the Y-direction detecting wire are provided on the periphery of the second substrate.

6. The liquid crystal display panel according to claim 5, wherein a touch driving circuit connected with the X-direction sensor and the Y-direction sensor is further provided.

7. The liquid crystal display panel according to claim 1, wherein in the press condition, the first and second connection electrodes on the second substrate contact with the secondary spacer on the first substrate and connected with each other through the conductive electrode on the secondary spacer.

8. The liquid crystal display panel according to claim 1, wherein at least one of the first connection electrode and the second connection electrode is in a form of via hole.

9. A liquid crystal display comprising a liquid crystal panel according to claim 1.

* * * * *